United States Patent [19]

Kwech

[11] Patent Number: 4,758,121
[45] Date of Patent: Jul. 19, 1988

[54] BORING MACHINE

[75] Inventor: Horst Kwech, Lake Bluff, Ill.

[73] Assignee: Westinghouse Electric Corp., Pittsburgh, Pa.

[21] Appl. No.: 896,029

[22] Filed: Aug. 13, 1986

[51] Int. Cl.$^4$ ............................................. B23B 5/36
[52] U.S. Cl. ................................. 409/185; 82/1.2;
 82/2 E; 82/4 C; 408/81; 408/104; 408/129
[58] Field of Search ..................... 408/80, 81, 13, 82,
 408/83, 103, 104, 105, 106, 108, 109, 111, 129,
 130, 146; 409/143, 185, 190, 199; 51/170 R;
 82/1.2, 2 E, 4 C

[56] References Cited

U.S. PATENT DOCUMENTS

| 2,706,917 | 4/1955 | Hill | 408/130 X |
| 3,710,659 | 1/1973 | Pagella et al. | 82/1.2 |
| 4,050,836 | 9/1977 | Anders | 408/80 X |
| 4,084,484 | 4/1978 | Shklyanov et al. | 82/1.2 X |
| 4,248,559 | 2/1981 | Deckenback et al. | 408/82 X |
| 4,452,110 | 6/1984 | Emmerson | 408/82 X |

FOREIGN PATENT DOCUMENTS 2063113  6/1981  United Kingdom ................ 82/4 C Primary Examiner—Gil Weidenfeld
Assistant Examiner—Glenn L. Webb

[57] ABSTRACT

A boring machine which is portable for field use and which is self-chucking and self-centering and has the capability of performing precision machining operations under computer control. The machining operations include pipe boring and internal threading. The boring machine has a chuck with relatively movable components including radially extendable blades for engagement with the interior of a pipe wall. A tool head is mounted for axial movement on a tubular drive shaft which is rotatably supported in cantilever fashion by the chuck. The actuation of the chuck and rotation of the drive shaft are derived from hydraulic means on the chuck within the interior of the pipe and connected to external fluid circuitry through stationary manifolds and fluid passages formed in the wall of the tubular drive shaft. The tool head is moved axially of the drive shaft by a lead screw rotatably driven by a servomotor and a tool slide is radially movable on the tool head by a second servomotor. The servomotors and associated encoder are connected to external electrical circuitry through a slip ring structure.

8 Claims, 5 Drawing Sheets

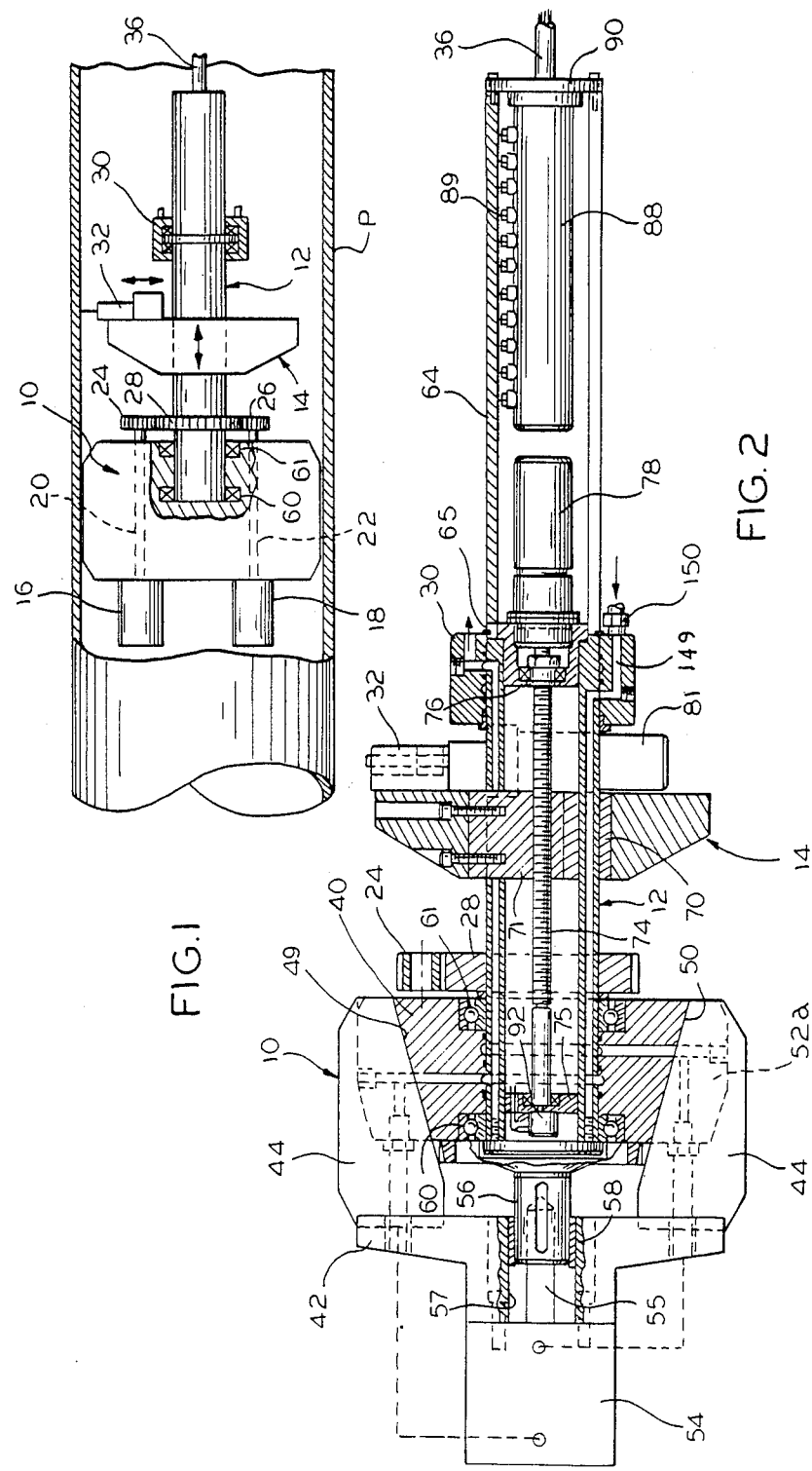

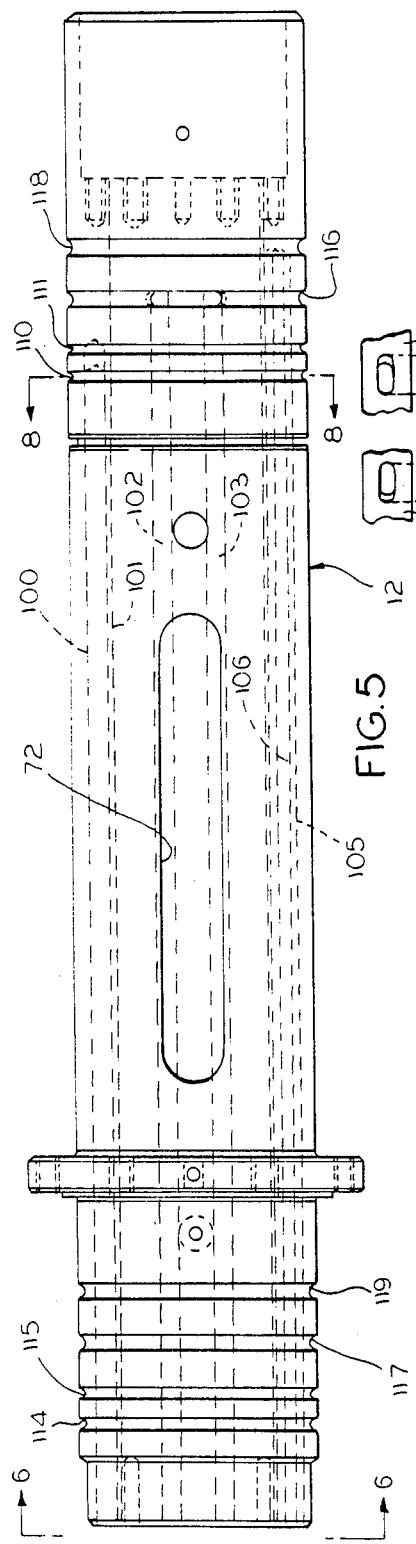
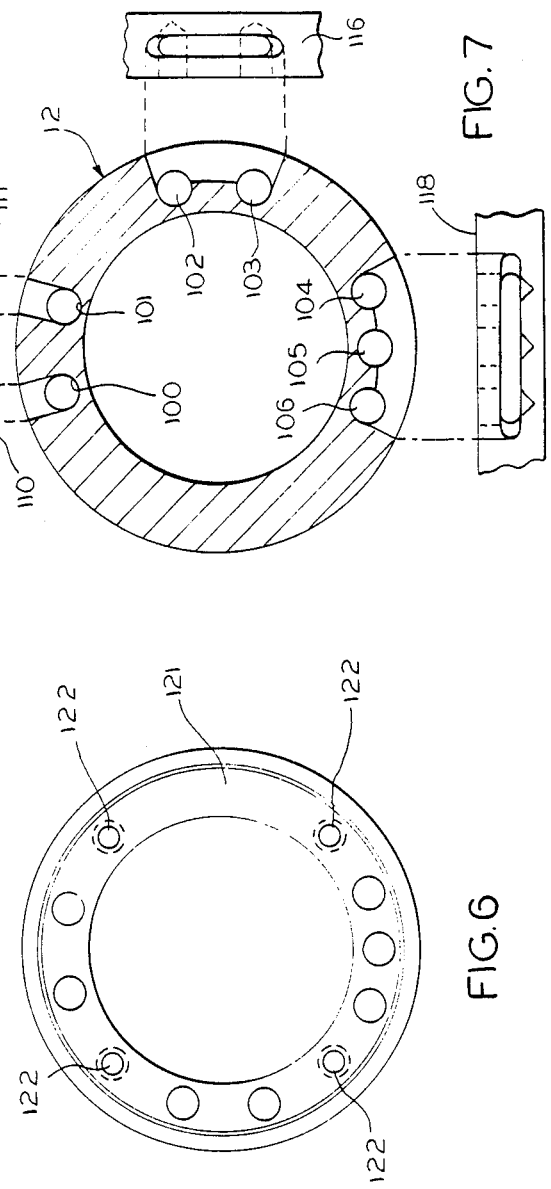
FIG. 5
FIG. 6
FIG. 7

BORING MACHINE

BACKGROUND OF THE INVENTION

1. Field of the Invention

The invention relates to a boring machine which is self-chucking and self-centering and which may be remotely controlled including control by a computer and which is capable of performing precision machining operations including pipe boring and internal threading when installed in the field. The boring machine is of a portable construction and has a self-centering chuck positionable within the pipe with the capability for quick setup and therefore, with the remote computer control, has particular utility for use in a radioactive or hostile environment.

2. Description of the Prior Art

Machines for boring pipe or other tubular members are generally known wherein a tool carrying boring bar is driven by means external of the pipe or other tubular element. Insofar as known to Applicant, portable machines for use in the field for boring a pipe have had clamping structure for clamping onto the outside of the pipe and an external drive associated with the clamping structure for imparting motion to the boring tool within the pipe.

SUMMARY OF THE INVENTION

The invention relates to a portable boring machine which is self-chucking and self-centering for quick setup within a tubular member such as a pipe to be machined and which has the capability for computer control and the capability of surveying the wall to be machined to determine any eccentricity and control the boring according to the survey.

In a machine shop, a boring operation can be performed simply. In the field, the operation can be difficult and time consuming. The disclosed invention simplifies the operation to render them less time consuming which is particularly important when working in a radioactive or hostile environment.

More particularly, the boring machine has a self-centering chuck positionable within a pipe and which rotatably mounts an elongate tubular drive shaft at an end thereof. A tool head is mounted on the drive shaft for rotation therewith as well as relative axial movement. The tool head has a movable radial tool slide and servomotors effect axial movement of the tool head and radial movement of the tool slide. The actuation of the chuck and rotation of the drive shaft are achieved through operation of hydraulic means associated therewith and more particularly by a hydraulic cylinder and a hydraulic motor, respectively. These hydraulic means are associated with the chuck and located remote from an open end of the pipe and are supplied with hydraulic fluid by passage means formed in the wall of the rotatable tubular shaft.

Additionally, the servomotors for operating the tool head and radial tool slide are rotatable with the tubular drive shaft referred to in the preceding paragraph and these servomotors are connected to external electric circuitry by means of slip ring construction.

An object of the invention is to provide a boring machine for performing cutting operations on a pipe comprising a self-centering chuck positionable within the pipe and which supports an elongate tubular member with a tool mounting structure including a tool head for a tool movably mounted on the elongate tubular member, and means for moving the tool head relative to said elongate tubular member including a servomotor mounted within the elongate tubular member.

Still another object of the invention is to provide a boring machine as defined in the preceding paragraph wherein said elongate tubular member is a drive shaft rotatably mounted on the chuck with means including a fluid motor mounted on the chuck for rotating the drive shaft, and fluid passages in the wall of the drive shaft communicating with the fluid motor.

Still another object of the invention is to provide a boring machine as defined in the preceding paragraphs including a fluid cylinder mounted on one component of said chuck and operable to move another component thereof, and additional fluid passages in the wall of the drive shaft communicating with the fluid cylinder.

Still another object of the invention is to provide a machine for machining the interior of a pipe and which is self-chucking and self-centering comprising: a chuck with a plurality of radially movable blades for engaged against the interior of the pipe and having a chuck body; a fluid cylinder operable for moving the blades radially outward; a tubular drive shaft rotatably mounted at an end thereof to said chuck body; a fluid motor mounted on said chuck body, gearing between said fluid motor and said drive shaft; a tool head surrounding said drive shaft and rotatable therewith and movable lengthwise thereof; drive means for moving said tool head along the drive shaft including a servomotor within the drive shaft and fixed thereto, a lead screw rotatable by the servomotor and extending lengthwise of the drive shaft, and a member threaded on said lead screw and connected to said tool head; a radial tool slide movably mounted on said tool head, and a servomotor on the tool head for moving the radial tool slide; means for making electrical connections between an external supply and said servomotors which rotate with the drive shaft; means for connecting said fluid motor and fluid cylinder to an external fluid circuit comprising a plurality of fluid passages in the wall of the drive shaft extending lengthwise thereof, a fluid manifold in said chuck body communicating with said fluid passages in the drive shaft, and flow passages in said chuck body extending from said fluid manifold for connection to said fluid cylinder and fluid motor; and a manifold surrounding the drive shaft at a location remote from the chuck for communication with the fluid passages in said drive shaft and the exterior of the manifold having piping connections to external fluid circuitry.

A cutting tool has two axes of movement of infinite ratio provided by computer controllable servomotors. This enables the performance of threading operations with the required pitch and depth being computer generated.

BRIEF DESCRIPTION OF THE DRAWINGS

FIG. 1 is a diagrammatic view of the boring machine operably positioned within a length of pipe with the pipe partially in section;

FIG. 2 is a longitudinal central vertical section of the boring machine;

FIG. 5 is a plan view of the tubular drive shaft as seen in FIG. 2 and on an enlarged scale;

FIG. 6 is an end view of the drive shaft taken as viewed in the direction of the arrows 6—6 in FIG. 5;

FIG. 7 is a composite view rather than a true section showing port detail for the fluid passages formed in the wall of the drive shaft with the actual porting being sequentially spaced along the length of the drive shaft;

Figure 3:
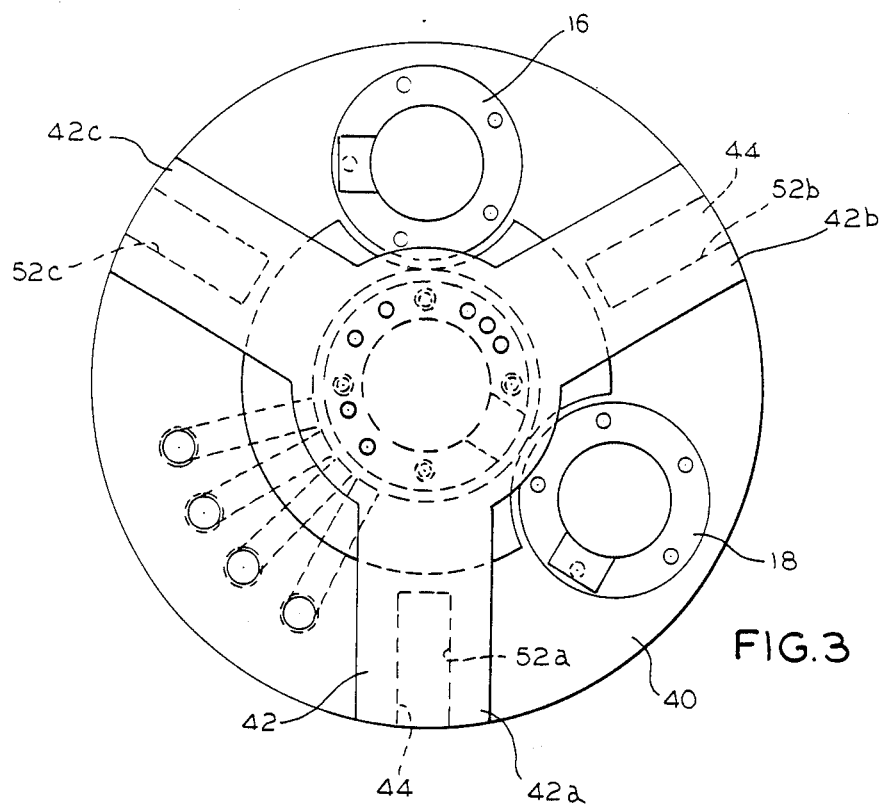
FIG. 3 is an end view of the boring machine looking toward the left-hand end thereof as viewed in FIG. 2 and on an enlarged scale.

DESCRIPTION OF THE PREFERRED EMBODIMENT:

The boring machine which is portable for use in the field is shown diagrammatically in FIG. 1 positioned for operation within a pipe P.

A chuck, indicated generally at 10, is of a self-chucking and self-centering construction and has a plurality of radially movable blades, to be described, which move outwardly into engagement with the inner surface of the wall of the pipe.

An elongate tubular member in the form of a drive shaft, indicated generally at 12, is rotatably mounted at an end thereof on the chuck and carries a tool head indicated generally at 14 for rotation therewith. The rotatable drive shaft 12 is rotated by a pair of fluid drive motors 16 and 18 mounted on the chuck and which have the respective drive shafts 20 and 22 with drive gears 24 and 26 respectively, which mesh with a driven gear 28 fixed to the drive shaft 12.

The drive motors 16 and 18 are hydraulic motors and these motors as well as the hydraulic cylinder associated with the chuck for extending the radially movable blades are, as to be described, supplied with fluid under pressure from a manifold 30 which connects with fluid passages in the wall of the drive shaft and which communicate with a similar manifold within the chuck 10.

The tool head 14 in addition to rotating with the drive shaft 12 also moves axially thereof by means of a servomotor and lead screw to be described. A radially movable tool slide 32 is carried on the tool head and is operated by a servomotor with this structure more particularly described in the detailed figures of the drawings.

An external electrical lead 36 connects to a slip ring structure whereby the servomotors for the tool head and the tool slide are connected to a source of electricity and with an encoder associated with each of the tool head and tool slide movements also having electrical connections through slip ring structure.

The overall construction is shown more particularly in FIG. 2 and with the fluid motors for rotating the drive shaft 12 being omitted for clarity.

Figure 10:
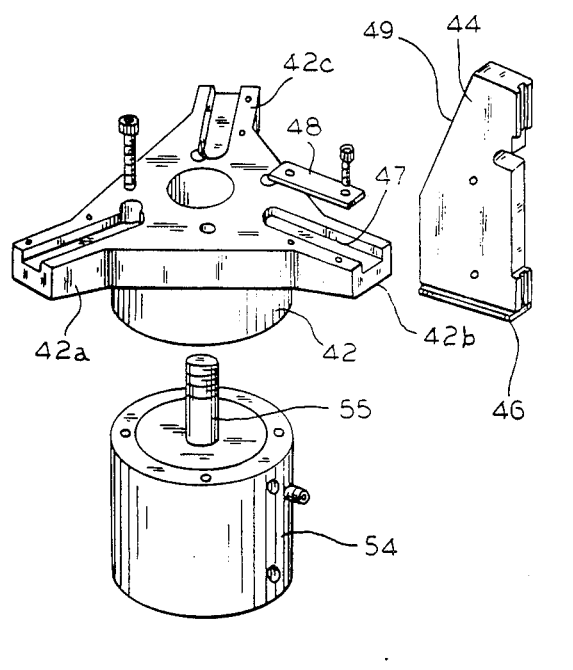
FIG. 10 is an exploded view of certain components of the chuck and the actuating mechanism therefor.

The chuck 10 has a pair of relatively movable components including a chuck body 40 and a pressure plate 42 having three equally spaced-apart legs 42a, 42b, and 42c, and which is shown particularly in the exploded view of FIG. 10. Each of the pressure plate legs movably mounts a radially movable blade 44 by means of a flanged blade base 46 being movably guided in a radial slot 47 in the pressure plate leg and with the flange base being retained by retaining plate 48 which overlies the flanged base and attaches to the pressure plate leg. Each of the blades has a sloped cam face 49 which coacts with a sloped surface 50 on the chuck body 40. The chuck body has three radially extending slots 52a, 52b, and 52c in which the three blades 44 are movably disposed. The pressure plate 42 and the chuck body 40 are caused to move relative to each other by a hydraulic cylinder 54 having the body thereof fixed to the pressure plate 42 and a rod 55 fixed to a guide hub 56 suitably secured by a flange thereof to the chuck body 40. The pressure plate has a bore 57 with a bushing 58 for sliding support on the guide hub.

Operation of the hydraulic cylinder to draw the chuck body 40 and pressure plate 42 toward each other causes radially outward movement of the blades 44 because of the cam action therebetween with equal extension of the blades providing for self-centering of the chuck 10.

The rotatable drive shaft 12 is rotatably supported at one end thereof by a pair of ball bearings 60 and 61 mounted in the chuck body 40 and a tubular member 64 has a fixed connection 65 to an end of the drive shaft 12 to form an extention thereof.

The tool head 14 is an annular member having a bearing 70 for slidable mounting thereof on the drive shaft 12. A key member 71 is fixed in the central opening of the tool head and coacts with a slot 72 in the drive shaft 12 (FIG. 5) for rotatably interconnecting the tool head and the drive shaft while permitting relative axial movement. The axial movement is achieved by rotation of a lead screw 74 which is threadably connected to the key member 71 and rotatably mounted at its opposite ends by bearings 75 and 76 supported within the drive shaft 12. The lead screw is connected at one end to a servomotor 78 mounted to the drive shaft at an end thereof whereby operation of the servomotor will rotate the lead screw 74 for resulting axial movement of the tool head 14.

Figure 9:
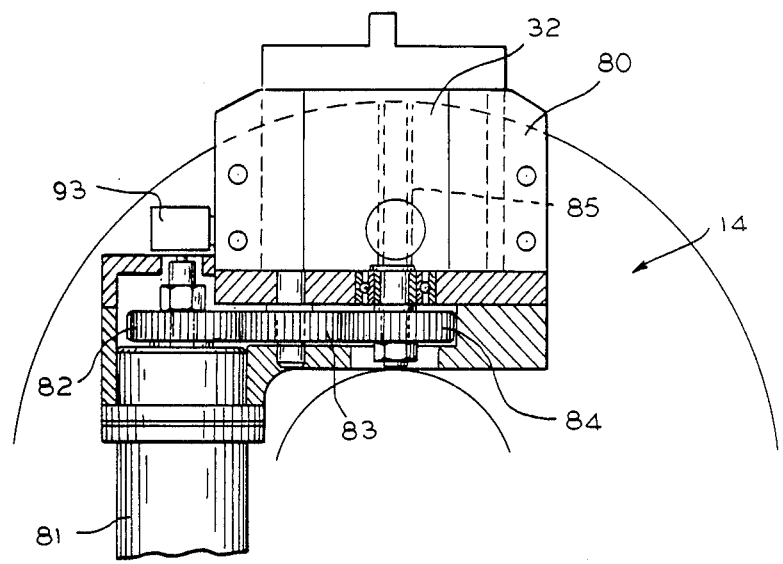
FIG. 9 is a fragmentary view with parts in section of the drive for the radially movable tool slide.

The tool slide 32 and the drive therefor are shown particularly in FIG. 9. The tool slide 32 is mounted in a female tool slide member 80 fixed to the tool head 14 and is caused to move relative thereto by operation of a servomotor 81 having its drive shaft fixed to a gear 82 meshing with an idler gear 83 which meshes with a gear 84 fixed to a lead screw 85 threadably connected to the tool slide 32. Rotation of the gear 82 by operation of the servomotor will result in either radial inward or outward movement of the tool slide 32 dependent upon the direction of rotation of the gear 82.

The servomotor 78 for axial movement of the tool head 14 and the servomotor 81 for radial movement of the tool slide 32 are connected to external electrical circuitry by means of a commercially available slip ring unit 88 having an external cylinder with wire connections 89 and which has a flange 90 connected to the tubular member 64 for rotation with the drive shaft 12. The external electrical lead 36 is fixed against rotation and extends to a source of power. Each of the servomotors 78 and 81 have an encoder associated therewith to provide accurate information as to location of the part operated by the servomotor. An encoder 92 is associated with the end of the lead screw 74 and an encoder 93 is connected to the output shaft of the servomotor 81.

The hydraulic cylinder 54 and the fluid motors 16 and 18 have connections to external fluid circuitry by means of the previously referred to manifold 30 disposed in surrounding relation to an end of the drive shaft 12 and fixed against rotation and a second manifold 94 formed within an internal bore of the chuck body 40 which is also stationary during operation. The fluid connections between the pair of stationary manifolds are defined by a plurality of fluid passages formed in the walls of the drive shaft 12.

Referring particularly to the composite view of FIG. 7, there are four different flow paths defined individually by one or more flow passages in the wall of the drive shaft 12.

Figure 8:
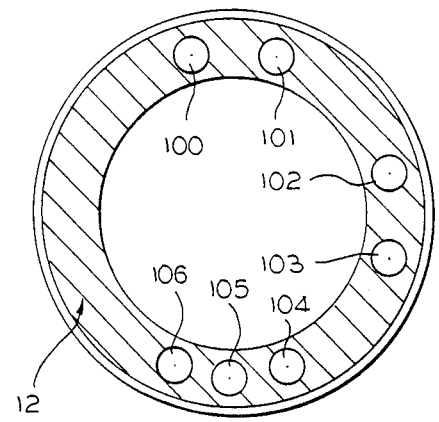
FIG. 8 is a sectional view on an enlarged scale taken generally along the line 8—8 in FIG. 5.

A pair of flow paths to the hydraulic cylinder 54 for chuck operation include the fluid passages 100 and 101 in the wall of the drive shaft 12. A flow path for supply of fluid under pressure to the fluid motors 16 and 18 includes a pair of fluid passages 102 and 103 in the wall of the drive shaft 12. A flow path for return of fluid from the fluid motor 16 and 18 includes the fluid passages 104, 105, and 106 in the wall of the drive shaft 12. The drive shaft 12 has a series of peripheral annular grooves which are associated with the stationary manifolds and connect to the fluid passages by radially drilled passages. A groove 110 is associated with the fluid passage 100, and a groove 111 is associated with the fluid passage 101 with there being corresponding grooves 114 and 115 at the opposite end of these fluid passages. Flow passages 102 and 103 are associated with and communicate with a peripheral annular groove 116 and a corresponding annular groove 117 at the opposite end thereof. The three fluid passages 104–106 communicate at opposite ends with peripheral annular grooves 118 and 119. FIG. 7 is a composite view showing the relation between peripheral annular grooves and fluid passages and is a composite of sections taken in four different locations along the length of the right-hand end of the drive shaft as is evident from the lengthwise spacing of the peripheral annular grooves 110, 111, 116 and 118. FIG. 8 is a sectional view showing a preferred orientation of the fluid passages. However, the spacing and relation between the fluid passages could be varied from the angular relations shown.

The fluid passages in the drive shaft wall open to one end thereof and are closed by an end plate 121 formed as part of the guide hub 56 and secured to the chuck body 40 by fastening members 122.

Figure 4:
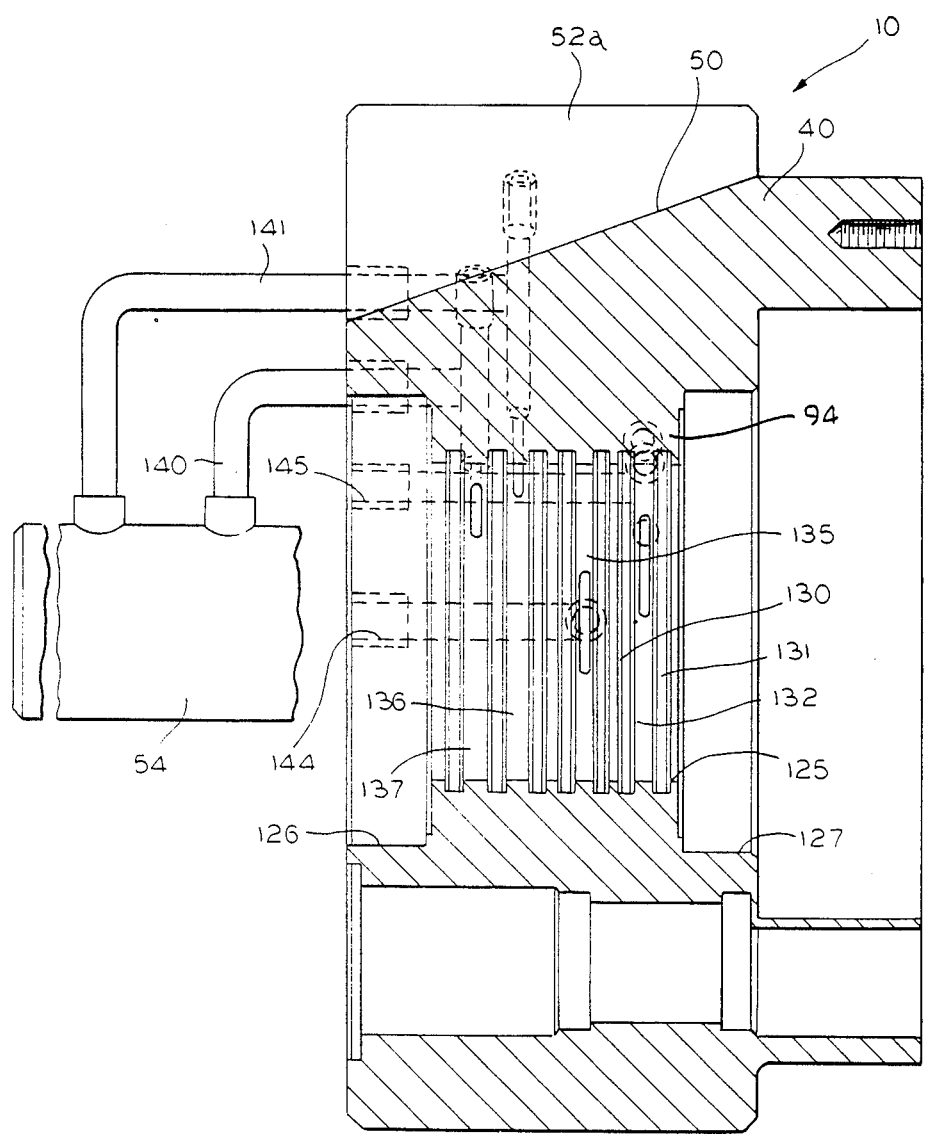
FIG. 4 is a central vertical section of one component of the chuck as seen in FIG. 2 on an enlarged scale and showing the piping connections to a hydraulic cylinder.

Each of the manifolds are constructed similarly for coaction with the peripheral annular grooves in the drive shaft 12. The chuck body 40 is shown in FIG. 4 with the internal bore 125 thereof having the recesses 126 and 127 for mounting the bearings 60 and 61, respectively, and having a series of annular grooves for receiving O-rings and which define annular flow channels therebetween which communicate with the fluid passages in the drive shaft 12. The grooves 130 and 131 recieve O-rings and define an annular flow channel 132 which communicates with the drive shaft peripheral annular groove 119. Additional annular O-ring grooves result in separated annular flow channels 135, 136 and 137. The annular flow channel 135 communicates with the peripheral annular groove 117 of the drive shaft. The annular flow channel 136 communicates with the peripheral annular groove 115 and the flow channel 136 communicates with the peripheral annular groove 114 of the drive shaft.

As previously stated, the fluid passage 100 in the drive shaft 12 extends to the peripheral annular groove 114 with supply of fluid to the cylinder 54 by flow through the annular flow channel 137 which communicates with internal passages in the chuck body 40 and with an external pipe connection 140 connected to the hydraulic cylinder 54. The second fluid connection to the fluid cylinder 54 is through the fluid passage 101 in the drive shaft which communicates with the annular flow channel 136 of the manifold, internal passages in the chuck body 40 and an external pipe connection 141 to the fluid cylinder 54.

The motor supply fluid passages 102 and 103 in the drive shaft communicate with the annular flow channel 135 which communicates with an internal passage 144 in the chuck body which by external piping (not shown) can be connected to the fluid motors. Fluid is exhausted from the fluid motors through piping and an internal passage 145 in the chuck body 40 which communicates with the annular flow channel 132 in the chuck body. The annular flow channels 135 and 132 connect with the peripheral annular grooves 117 and 119 respectively of the drive shaft 12. The manifold 30 has a construction basically the same as that described particularly in connection with the chuck body 40 and has a series of O-rings in grooves defining separate annular flow channels which communicate with the peripheral annular grooves 110, 111, 116 and 118 of the drive shaft 12. The stationary manifold 30 has flow passages 149 and pipe connections extending to external fluid circuitry with one of these connections being shown at 150.

In operation, an operator places the boring machine within a pipe as shown in FIG. 1 and operates a valve in the external hydraulic circuitry for actuation of the hydraulic cylinder 54 to extend the radially movable blades 44 to center and securely lock the chuck body within the pipe P. The external hydraulic circuitry can then be controlled for operation of the fluid motors 16 and 18 and the servomotors 78 and 81 can be controlled by a computer connected to the external electric circuitry.

The boring machine is operable for surveying the pipe wall to determine any eccentricity and thereafter operate the boring machine accordingly. The tool head 14 can be rotated about the pipe interior and a sensing probe carried by the tool slide 32. The encoders 92 and 93 provide position information and a computer can calculate any eccentricity in the pipe and thereafter adjust the cutting tool to machine a true circle within the pipe. A single tool slide 32 has been shown, however, it will be evident that a pair of tool slides and their associated servomotors could be mounted on the tool head 14 if desired.

I claim:

1. A boring machine for a pipe which is self-chucking and self-centering comprising, a chuck having a pair of relatively movable components and a plurality of radially movable blades for engagement with the interior of a pipe, means on said chuck including a first manifold and a fluid cylinder for relatively moving said components to expand said blades, an elongate tubular drive shaft having first and second ends with the first end rotatably supported by said chuck, a second manifold associated with said tubular drive shaft adjacent said second end, means including a fluid motor on the chuck for rotating said drive shaft relative to said chuck, a tool head mounted on said drive shaft intermediate the first and second ends thereof for rotation therewith and for axial movement lengthwise thereof, a remotely operable servomotor and lead screw mounted within said drive shaft and operatively connected to said tool head for causing said axial movement, and fluid passages in the wall of said drive shaft communicating with said first and second manifolds for placing said fluid motor and fluid cylinder in communication with a source of fluid supplied to the second manifold at a location remote from said fluid motor and fluid cylinder.

2. A machine for machining the interior of a pipe comprising: a chuck with a pressure plate mounting a plurality of radially movable blades for engaging against the interior of the pipe and a chuck body movable relative to the pressure plate to force the blades outwardly; a fluid cylinder connected between the pressure plate and the chuck body for causing relative movement therebetween; a drive shaft in the form of an elongate tubular member rotatably mounted at one end thereof to said chuck body and having an elongate slot; a fluid motor mounted on said chuck body and gearing between said fluid motor and said drive shaft; a tool head including an annular member surrounding said drive shaft intermediate the ends thereof and rotatable therewith and movable lengthwise thereof; drive means for moving said tool head along the drive shaft including a servomotor and lead screw within the drive shaft and a key member extending through said elongate slot and threaded on said lead screw and connected to said tool head; a radial tool slide movably mounted on said tool head and a servomotor on the tool head for moving the radial tool slide; slip ring means for making electrical connections between an external supply and said servomotors which rotate with the drive shaft; and means for connecting said fluid motor and fluid cylinder to an external fluid circuit comprising, a plurality of fluid passages in the wall of the drive shaft extending for substantially the entire length thereof for enabling flow of fluid along the length of the drive shaft and, a fluid manifold formed in said chuck body having a series of grooves to communicate separately with said fluid passages in the drive shaft, and fluid passages in said chuck body extending between said grooves and the exterior of the chuck body for piping connection to said fluid cylinder and fluid motor, and a manifold surrounding the other end of the drive shaft remote from the chuck and having a series of grooves to communicate separately with the fluid passages in said drive shaft, and flow passages in said manifold extending between the grooves therein and the exterior thereof for piping connection to external fluid circuitry.

3. A machine as defined in claim 2, including a pair of encoders associated one with each of the servomotors for providing accurate information as to the positions of the tool head and the radial tool slide.

4. A boring machine for a pipe which is self-chucking and self-centering comprising, a chuck having a plurality of radially movable blades for engagement with the interior of a pipe, means including a hydraulic cylinder for moving said blades, an elongate tubular drive shaft having an end rotatably supported by said chuck, means including a hydraulic motor on the chuck for rotating said drive shaft relative to said chuck, a tool head mounted on said drive shaft for rotation therewith and for axial movement lengthwise thereof, a remotely operable servomotor mounted within said drive shaft and operatively connected to said tool head for causing said axial movement, a tool slide mounted on said tool head for movement along an axis normal to the path of movement of the tool head, means including a servomotor for moving the tool slide, and fluid passages in the wall of said drive shaft for placing said fluid motor and fluid cylinder in communication with a source of fluid supplied to the drive shaft at a location remote from said fluid motor and fluid cylinder and at a side of said tool head opposite said chuck.

5. A machine for machining the interior of a pipe and which is self-chucking and self-centering comprising:

a chuck with a plurality of radially movable blades for engaging against the interior of the pipe and having a chuck body;

a fluid cylinder operable for moving the blades radially outward;

a tubular drive shaft rotatably mounted at one end thereof to said chuck body and having a second end;

a fluid motor mounted on said chuck body, gearing between said fluid motor and said drive shaft;

a tool head surrounding and intermediate the ends of said drive shaft and rotatable therewith and movable lengthwise thereof;

drive means for moving said tool head along the drive shaft including a servomotor within the drive shaft and fixed thereto, a lead screw rotatable by the servomotor and extending lengthwise of the drive shaft, and a member threaded on said lead screw and connected to said tool head;

a radial tool slide movably mounted on said tool head, and a servomotor on the tool head for moving the radial tool slide;

means for making electrical connections between an external supply and said servomotors which rotate with the drive shaft;

means for connecting said fluid motor and fluid cylinder to an external fluid circuit comprising a plurality of fluid passages in the wall of the drive shaft extending lengthwise thereof, a fluid manifold in said chuck body communicating with said fluid passages in the drive shaft, and flow passages in said chuck body extending from said fluid manifold for connection to said fluid cylinder and fluid motor; and a manifold surrounding the drive shaft at a location adjacent said second end of the drive shaft and remote from the chuck for communication with the fluid passages in said drive shaft and the exterior thereof having piping connections to external fluid circuitry.

6. A boring machine comprising: a chuck having a plurality of radially movable blades for engaging against the interior of the pipe and a chuck body movable to force the blades outwardly; a fluid cylinder for moving the chuck body; a tubular drive shaft rotatably mounted at an end thereof to said chuck body; at least one fluid motor mounted on said chuck body and gearing between said fluid motor and said drive shaft; a tool head rotatable with the drive shaft and movable lengthwise thereof; drive means including a servomotor for moving said tool head along the drive shaft and fixed thereto; slip ring means for making electrical connections between an external supply and said servomotor; and means for connecting said fluid motor and fluid cylinder to an external fluid circuit comprising, a plurality of fluid passages in the wall of the drive shaft extending for substantially the entire length thereof, a fluid manifold within said chuck body communicating with said fluid passages in the drive shaft, and a stationary manifold surrounding the drive shaft remote from the chuck to have the tool head therebetween and communicating with the fluid passages in said drive shaft.

7. A boring machine as defined in claim 6 including an encoder associated with said servomotor for indicating the position of the tool head.

8. A boring machine as defined in claim 6 including a radially movable tool slide on the tool head, means including a servomotor on the tool head for moving the tool slide, and a pair of encoders associated one with each of the servomotors for indicating the position of the tool head and tool slide.

* * * * *